US011122491B2

United States Patent
Pignataro et al.

(10) Patent No.: US 11,122,491 B2
(45) Date of Patent: Sep. 14, 2021

(54) IN-SITU BEST PATH SELECTION FOR MOBILE CORE NETWORK

(71) Applicant: Cisco Technology, Inc., San Jose, CA (US)

(72) Inventors: Carlos M. Pignataro, Cary, NC (US); Om Prakash Suthar, Bolingbrook, IL (US); Nagendra Kumar Nainar, Morrisville, NC (US); Rajiv Asati, Morrisville, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/561,634

(22) Filed: Sep. 5, 2019

(65) Prior Publication Data
US 2021/0076292 A1 Mar. 11, 2021

(51) Int. Cl.
*H04W 40/12* (2009.01)
*H04L 12/26* (2006.01)
(Continued)

(52) U.S. Cl.
CPC ......... *H04W 40/12* (2013.01); *H04L 43/0817* (2013.01); *H04L 43/0829* (2013.01);
(Continued)

(58) Field of Classification Search
CPC ... H04W 40/12; H04W 24/08; H04W 40/248; H04W 40/28; H04L 43/0817;
(Continued)

(56) References Cited

U.S. PATENT DOCUMENTS 10,355,981 B1 * 7/2019 Matthews ............... H04L 45/22
10,498,639 B2 * 12/2019 Song ...................... H04L 45/38
(Continued)

FOREIGN PATENT DOCUMENTS

WO WO-2012122435 A2 * 9/2012 ............. H04L 63/30
WO 2017076454 A1 5/2017

OTHER PUBLICATIONS

Brockners, "Next-gen Network Telemetry is Within Your Packets: In band OAM," retrieved from https://www.cisco.com/c/dam/m/en_us/network-intelligence/service-provider/digital-transformation/knowledge-network-webinars/pdfs/0628-techad-ckn.pdf, Jun. 28, 2017, 51 pages.

(Continued)

*Primary Examiner* — Yemane Mesfin
*Assistant Examiner* — Intekhaab A Siddiquee
(74) *Attorney, Agent, or Firm* — Edell, Shapiro & Finnan, LLC (57) ABSTRACT

Techniques are provided that leverage inband metadata techniques for use in a mobile core network in order to create relevant third generation 3rd Generation Partnership Project (3GPP) control plane interfaces between virtual control plane and virtual user plane elements that can be used to instruct the virtual entities to perform various functions, collect telemetry and other data from the virtual entities and signal maintenance messages between control plane and user plane entities. One control plane interface can be used to perform holistic performance analysis functionalities and identify the better performing path and accordingly use primary path and warm paths for control plane exchanges.

20 Claims, 7 Drawing Sheets

(51) Int. Cl.

| | |
|---|---|
| *H04L 12/721* | (2013.01) |
| *H04L 12/707* | (2013.01) |
| *H04L 12/841* | (2013.01) |
| *H04W 24/08* | (2009.01) |
| *H04W 40/28* | (2009.01) |
| *H04L 12/833* | (2013.01) |
| *H04L 12/801* | (2013.01) |
| *H04L 12/803* | (2013.01) |
| *H04W 40/24* | (2009.01) |

(52) U.S. Cl.
CPC ........ *H04L 43/0852* (2013.01); *H04L 45/124* (2013.01); *H04L 45/22* (2013.01); *H04L 47/283* (2013.01); *H04W 24/08* (2013.01); *H04W 40/248* (2013.01); *H04W 40/28* (2013.01)

(58) Field of Classification Search
CPC ............. H04L 43/0829; H04L 43/0852; H04L 45/124; H04L 45/22; H04L 47/283
USPC ......................................................... 370/238
See application file for complete search history.

(56) References Cited

U.S. PATENT DOCUMENTS

| | | | |
|---|---|---|---|
| 10,813,086 B2 * | 10/2020 | Zhu | ...................... H04W 76/16 |
| 2009/0310485 A1 | 12/2009 | Averi et al. | |
| 2017/0111209 A1 | 4/2017 | Ward et al. | |
| 2019/0327772 A1 * | 10/2019 | Luo | ...................... H04W 88/085 |
| 2020/0059992 A1 * | 2/2020 | Skog | ........................ H04L 45/38 |

OTHER PUBLICATIONS

Cisco, "Anycast RP," White Paper, retrieved from https://www.cisco.com/c/en/us/td/docs/ios/solutions_docs/ip_multicast/White_papers/anycast.pdf, Nov. 19, 2001, 6 pages.

Brockners, et al., "Data Fields for In-situ OAM," draft-ietf-ippm-ioam-data-06, Internet Engineering Task Force (IETF), Internet-Draft, Standards Track, Jul. 4, 2019, 40 pages.

Mizrahi, et al., "In Situ OAM Profiles," draft-mizrahi-ippm-ioam-profile-00, Internet Engineering Task Force (IETF), Network Working Group, Internet-Draft, Informational, Mar. 11, 2019, 9 pages.

Spiegel, et al., "In-situ OAM raw data export with IPFIX," draft-spiegel-ippm-ioam-rawexport-01, Internet-Drafts are working documents of the Internet Engineering Task Force (IETF), Internet-Draft, Informational, Oct. 22, 2018, 22 pages.

Borst, et al., "Dynamic Path Selection in 5G Multi-RAT Wireless Networks," IEEE Infocom 2017—IEEE Conference on Computer Communications, May 2017, 9 pages.

Partridge, et al., "Host Anycasting Service," Internet Research Task Force (IRTF), Network Working Group, Request for Comments: 1546, Informational, Nov. 1993, 9 pages.

ETSI, "5G; System Architecture for the 5G System (3GPP TS 23.501 version 15.2.0 Release 15)," Technical Specification, ETSI TS 123 501, V15.2.0, Jun. 2018, 219 pages.

International Search Report and Written Opinion in counterpart International Application No. PCT/US2020/048349, dated Nov. 6, 2020, 16 pages.

F. Brockner et al., "Requirements for In-situ OAM", draft-brockners-inband-oam-requirements-02, Oct. 30, 2016, 23 pages.

* cited by examiner

→ ESTABLISHING AT LEAST A FIRST PATH AND A SECOND PATH THROUGH A NETWORK FOR COMMUNICATIONS BETWEEN A CONTROL PLANE ENTITY AND A USER PLANE ENTITY, THE FIRST PATH AND THE SECOND PATH BEING DISJOINT FROM EACH OTHER, THE FIRST PATH IS DESIGNATED AS A PRIMARY PATH AND THE SECOND PATH IS DESIGNATED AS A WARM PATH — 410

↓

GENERATING FIRST MESSAGES WHICH INCLUDE ENTROPY THAT CAUSES THE FIRST MESSAGES TO TRAVERSE THE FIRST PATH, FIRST INBAND METADATA THAT INCLUDES TIMESTAMP AND SEQUENCE INFORMATION, CONTROL PLANE MESSAGE INFORMATION, AND A FLAG TO INDICATE THAT THE FIRST MESSAGES ARE SENT VIA THE PRIMARY PATH AND CARRY REAL CONTROL PLANE MESSAGE INFORMATION — 420

↓

GENERATING SECOND MESSAGES WHICH INCLUDE ENTROPY THAT CAUSES THE SECOND MESSAGES TO TRAVERSE THE SECOND PATH, SECOND INBAND METADATA THAT INCLUDES TIMESTAMP AND SEQUENCE INFORMATION, DUMMY CONTROL PLANE MESSAGE INFORMATION, AND A FLAG TO INDICATE THAT THE SECOND MESSAGES ARE SENT VIA THE WARM PATH AND CARRY DUMMY CONTROL PLANE MESSAGE INFORMATION TO BE IGNORED BY THE USER PLANE ENTITY — 430

↓

SENDING THE FIRST MESSAGES AND THE SECOND MESSAGES INTO THE NETWORK — 440

510 — OBTAINING FIRST INBAND METADATA INCLUDED IN FIRST MESSAGES SENT BETWEEN A CONTROL PLANE ENTITY AND A USER PLANE ENTITY THROUGH A FIRST PATH IN A NETWORK, THE FIRST INBAND METADATA INCLUDING TIMESTAMP AND SEQUENCE INFORMATION FOR THE FIRST MESSAGES SENT THROUGH THE FIRST PATH, THE FIRST MESSAGES FURTHER INCLUDING A FLAG TO INDICATE THAT THE FIRST MESSAGES ARE SENT VIA A PRIMARY PATH AND CARRY REAL CONTROL PLANE MESSAGE INFORMATION

520 — OBTAINING SECOND INBAND METADATA INCLUDED IN SECOND MESSAGES SENT BETWEEN A CONTROL PLANE ENTITY AND A USER PLANE ENTITY THROUGH A SECOND PATH IN THE NETWORK, WHEREIN THE FIRST PATH AND THE SECOND PATH ARE DISJOINT FROM EACH OTHER, AND WHEREIN THE SECOND INBAND METADATA INCLUDING TIMESTAMP AND SEQUENCE INFORMATION FOR THE SECOND MESSAGES SENT THROUGH THE SECOND PATH, THE SECOND MESSAGES FURTHER INCLUDING A FLAG TO INDICATE THAT THE SECOND MESSAGES ARE SENT VIA A WARM PATH AND CARRY DUMMY CONTROL PLANE MESSAGE INFORMATION

530 — ANALYZING PERFORMANCE OF THE FIRST PATH AND OF THE SECOND PATH BASED ON THE FIRST INBAND METADATA AND THE SECOND INBAND METADATA

540 — DETERMINING WHETHER TO TOGGLE A STATE OF THE FIRST PATH AND OF THE SECOND PATH SUCH THAT THE FIRST PATH IS THE WARM PATH AND THE SECOND PATH IS THE PRIMARY PATH

550 — WHEN IT IS DETERMINED THAT PERFORMANCE OF THE SECOND IS BETTER THAN PERFORMANCE OF THE FIRST PATH, PROVIDING A COMMAND AT LEAST TO THE CONTROL PLANE ENTITY TO CAUSE THE CONTROL PLANE ENTITY TO GENERATE THE FIRST MESSAGES TO INCLUDE THE DUMMY CONTROL PLANE MESSAGE INFORMATION AND TO SET THE FLAG OF THE FIRST MESSAGES TO INDICATE THAT THE MESSAGES ARE SENT VIA THE WARM PATH, AND TO CAUSE THE CONTROL PLANE ENTITY TO GENERATE THE SECOND MESSAGES TO INCLUDE THE REAL CONTROL PLANE MESSAGE INFORMATION AND TO SET THE FLAG OF THE SECOND MESSAGES TO INDICATE THAT THE SECOND MESSAGES ARE SENT VIA THE PRIMARY PATH

IN-SITU BEST PATH SELECTION FOR MOBILE CORE NETWORK

TECHNICAL FIELD

The present disclosure relates to best network path selection in a mobile core network.

BACKGROUND

A mobile core network (e.g., fifth generation (5G)) telcocloud infrastructure is distributed across multiple locations. The workloads may be virtual and may migrate across different hardware resources. Moreover, a control plane function may be remote from a data plane/user plane function. The control plane is responsible for instantiating state entries on the forwarding plane (data plane or user plane) based on the control messages.

In-Situ Operations Administration and Management (iOAM) is an inband telemetry data collection technique. iOAM allows a network/service operator to collect real-time telemetry data by embedding the data inband within actual traffic. With more interest in service level agreement (SLA)-based service offerings, selecting the best path for control plane and data plane traffic is becoming inevitable for service providers. In a 5G mobile core network, because most of workloads are virtual, it can be challenging to maintain out-of-band OAM connectivity.

BRIEF DESCRIPTION OF THE DRAWINGS

FIG. 5 is a flow chart depicting operations performed by a performance analysis server/process to select the best path between the control plane entity and the user plane entity, according to an example embodiment.

DESCRIPTION OF EXAMPLE EMBODIMENTS

Overview

Techniques are presented herein for best path selection between a control plane entity (node) and a user plane entity (node), such as may be useful in a mobile core network that supports communications for wireless user equipment. In accordance with an example embodiment, a control plane entity is configured to establish at least a first path and a second path through a network for communications between the control plane entity and a user plane entity. The first path and the second path being disjoint from each other, wherein the first path is designated as a primary path and the second path is designated as a standby/warm path. The control plane entity generates first messages which include entropy that causes the first messages to traverse the first path, first inband metadata that includes timestamp and sequence information, control plane message information, and a flag to indicate that the first messages are sent via the primary path and carry real control plane message information. The control plane entity generates second messages which include entropy that causes the first messages to traverse the second path, second inband metadata that includes timestamp and sequence information, dummy control plane message information, and a flag to indicate that the second messages are sent via the warm path and carry dummy control plane message information to be ignored by the user plane entity. The control plane entity sends the first messages and the second messages into the network.

The user plane entity is configured to obtain the first inband metadata from the first messages and second the inband metadata from the second messages, sends the first inband metadata and the second inband metadata to a performance analysis server. The performance analysis server is configured to analyze performance of the first path and of the second path based on the first inband metadata and the second inband metadata, and determine whether to toggle a state of the first path and of the second path such that the first path is the warm path and the second path is the primary path.

Example Embodiments

In a modern mobile core network (e.g., 5G), there is disaggregation of the control plane and the data plane. Control plane and data plane entities may be running in different parts of the network. Therefore, they need to communicate with each other over the network using some form of inband mechanism.

Currently, there is only one path from the control plane entity to the user plane entity. This may not be sufficient in all cases. For example, if something goes wrong on the path, the control plane entity may not be able to update the data plane entity in time to account for the failure. Any latency or packet loss issues in the network will have a direct impact on the control plane and the user plane communication. This in turn causes delay in instantiating the state and trees on the user plane entity, which can impact service level agreement (SLA) requirements.

In-Situ Operations Administration and Management (iOAM) is an inband telemetry data collection technique. iOAM allows a network/service operator to collect real-time telemetry data by embedding the data inband within actual traffic. Such collected inband telemetry data allows a network/service operator to instantly react to any network events. The telemetry data collected by iOAM can be done on different layers. For example, a Hop-by-Hop option collects the path and/or performance data from each network element at the network layer.

Presented herein are techniques that leverage iOAM for use in a mobile core network in order to create relevant third generation 3rd Generation Partnership Project (3GPP) control plane interfaces between virtual control plane (vCP) and virtual user plane (vUP) elements that can be used to instruct the virtual entities to perform various OAM functions, collect telemetry and other data from the virtual entities and signal maintenance messages between control plane and user plane entities. One 3GPP control plane interface can be used to perform holistic OAM functionalities and identify the better performing path and accordingly use primary/ warm sessions for control plane exchanges.

More specifically, techniques are provided for multipath awareness and performance analysis using iOAM to toggle the between two paths/sessions between the control plane entity and the user plane entity. The two paths are referred to herein as a primary path/session and a warm path/session. The warm path is not a backup session.

Best path selection is made using real data and in-situ in-band performance analysis. Multiple (two or more) connections are made between vCP and the vUP entities. One path is designated as the primary path or session and another of the paths is designated as the warm (standby) path. Based on performance measurements of the paths, a non-selected path is maintained as a warm (standby) path all the while iOAM is used to continue measuring performance of the paths, such as delay/latency, jitter, packet drops, etc. iOAM messages are optimized and scalability of the mobile core (e.g., 5G) network architecture is achieved. Again, iOAM is used on parallel links (primary and warm paths) for performance-based (delay) path selection. The warm path is maintained with active performance measurement.

Figure 1:
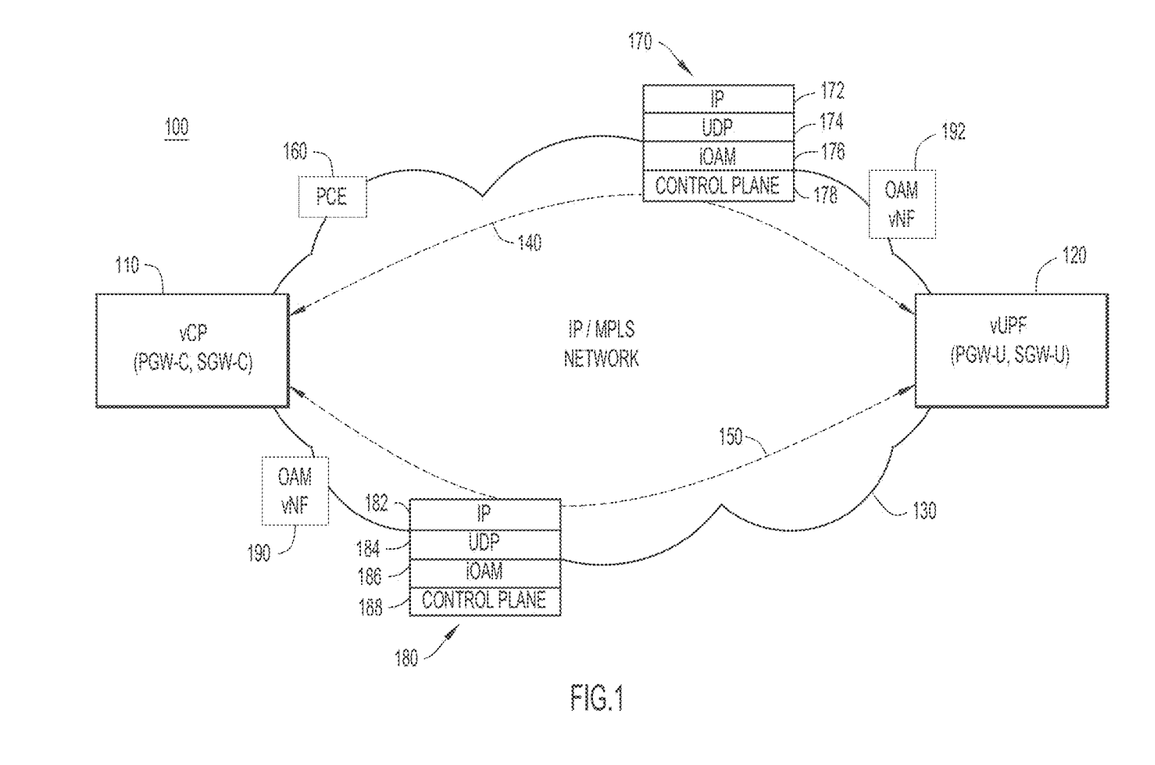
FIG. 1 is a block diagram of a network environment in which best path selection techniques are performed for communications between a control plane entity and a user plane entity, according to an example embodiment.

Reference is first made to FIG. 1. FIG. 1 shows a network environment 100 that includes a virtual control plane (vCP) entity 110 and a virtual user plane function (vUPF) 120 that are running on physical devices separate from each other and which communicate over an Internet Protocol (IP) or Multi-Protocol Label Switching (MPLS) network 130. In one example, the vCP entity 110 may be a Packet Data Network (PDN) Gateway Control Plane (PGW-C) function or a Serving Gateway Control Plane (SGW-C) function. Similarly, the vUPF 120 may be a PDN Gateway User Plane (PGW-U) function for 4G Control and User Plane Separation (CUPS) or a Serving Gateway User Plane (SGW-U) function for 5G CUPS.

The vCP entity 110 and vUPF 120 use multipath aware (bidirectional) control plane sessions for communication. The multiple paths between the vCP entity 110 and the vUPF 120 may be manually defined by the system operator, configured using a dual-planar network design or achieved using a centralized intelligence like a Path Computation Element (PCE) 160. Each of the (multipath) sessions will traverse over diverse paths, such as by leveraging software-defined networking (SDN) intelligence provided by the PCF 160.

Multipath control plane communication is inserted with an iOAM header that carries telemetry information, such as packet sequencing and/or timestamps. For a delay aware vCP-vUP path selection, time stamping is a useful component to be included in the iOAM header. To this end, FIG. 1 shows a packet 170 sent by the vCP 110 on the primary path 140 to vUPF 120. The packet 170 includes an Internet Protocol (IP) header 172, a User Datagram Protocol (UDP) header 174, an iOAM header 176 and a control plane message payload 178. Similarly, a packet 180 is sent by the vUPF 120 on the warm path 150 to vCP 110. The packet 180 includes an IP header 182, a UDP header 184, an iOAM header 186 and a control plane message payload 188. UDP is only an example of a transport type.

In one example, the control plane message carried in the packets 170 and 180 is based on the Packet Forwarding Control Protocol (PFCP). PFCP is a 3GPP protocol used on the Sx/N4 interface between the control plane function and the user plane function, specified in 3GPP Technical Specification (TS) 29.244.

Some properties of PFCP are noted here. One Sx association is established between a vCP entity 110 and a vUPF 120 before being able to establish Sx sessions on the vUPF 120. The Sx association may be established by the vCP entity 110 or by the vUPF 120. An Sx session is established in the vUPF 120 to provision rules instructing the vUPF 120 how to process certain traffic. An Sx session may correspond to an individual PDN connection, Traffic Detection Function (TDF) session or a standalone session not tied to any PDN connection/TDF session.

While PFCP is referred to as the control plane communications between the vCP 110 and the vUPF 120, this is only an example. The techniques presented herein are applicable to any communications between a control plane entity and a user plane entity in a mobile core network.

In one embodiment, native iOAM is used in which the vCP entity 110 and the vUPF 120 insert the iOAM header directly in the control plane session packets. In another embodiment, as shown in FIG. 1, an OAM virtual network function (vNF) is provided that runs as close as possible to the vCP 110 and vUPF 120. This is shown by the OAM vNF 190 proximate the vCP entity 110 and the OAM vNF 192 proximate the vUPF entity 120. The OAM vNFs 190 and 192 and exchange packets with iOAM with the above telemetry information.

Again, according to the embodiments presented herein, multiple sessions are created based on multipath awareness. One session/path is used as the primary path/session and the other is used as the warm path/session. Performance is monitored on the primary path/session and on the warm path/session. Based on analysis of the performance of the primary session and warm session, it may be determined to toggle between the primary path and the warm path.

Using iOAM has advantages over out-of-band probes. A probe is useful for performing measurements along a path, but it is not true inband because a transit node does not process a probe packet the same way as a data packet because the parameters (source address, destination address, source port, destination port, etc.) of the probe packet are not the same as a data packet communicated between the control plane entity and a user plane entity. Moreover, the transit nodes could be configured to deprioritize probe packets and therefore the performance analytics of probe packets are not an accurate representation of the control session between the control plane entity and the user plane entity.

Figure 2:
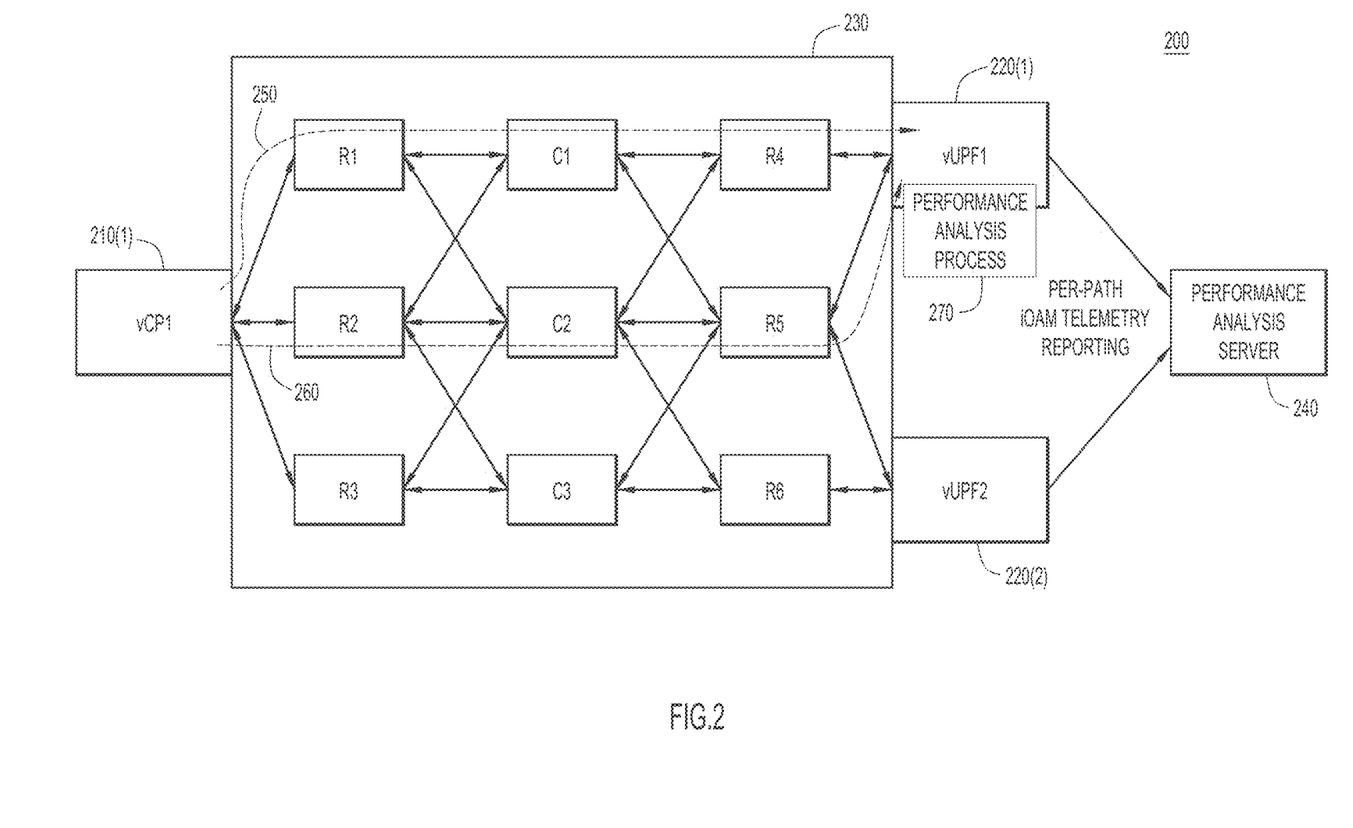
FIG. 2 is a more detailed block diagram of the network environment and showing two different/disjoint paths through a network and selection between the paths using inband metadata included in messages exchanged between a control plane entity and a user plane entity, according to an example embodiment.

Reference is now made to FIG. 2. FIG. 2 shows a network environment 200 that includes a first control plane entity, vCP1, at 210(1) and two user plane entities vUPF1 at 220(1) and vUPF2 at 220(2). FIG. 2 also shows the IP/MPLS network 230 over which the vCP1 110(1) communicates with the vUPF1 120(1) and vUPF2 120(2). The IP/MPLS network 230 includes transit network elements R1, R2, R3, R4, R5, R6, C1, C2 and C3, for example, Performance analysis server 240 is an entity (server computer, for example) that has communication connectivity with the vCP1 210(1), vUPF1 220(1) and vUPF2 220(2). It is to be understood that a connection arrow between the vCP1 210(1) and the performance analysis server 240 is not shown in FIG. 2 to simplify the diagram, but there is communication connectivity between the vCP1 210(1) and the performance analysis server 240. The performance analysis server 240 may also run OAM related operations. Each of the virtual entities (vCP1 210(1), vUPF1 220(1) and vUPF2 220(2)) upon receiving the iOAM data will extract the iOAM data and forward it to the performance analysis server 240 for analytics purpose.

For simplicity, communication between vCP1 210(1) and vUPF1 220(1) is described, as an example. It should be understood that similar techniques apply to communications between vCP1 210(1) and vUPF2 220(2). vCP1 210(1) is instructed to create two disjoint paths/sessions. These instructions may originate from a PCE, such as the PCE 160 shown in FIG. 1. The two paths/sessions are shown at 250 and 260. First path/session 250 traverses R1-C1-R4-vUPF1 and second path/session 260 traverses R2-C2-R5-vUPF1.

The paths/sessions are guaranteed to be diverse/disjointed by using different source/destination port information. For example, Path/Session 1 (corresponding to path/session 250)=src_udp=x1; dst_udp=y1. Path/Session 1 may be designated, by default, as the primary path/session. Path/Session 2 may be designated the warm path/session. Path/Session 2 (corresponding to path/session 260)=src_udp=x1, dst_udp=y2. Thus, since x1 and y1 are used as source and destination ports for packets along Path/Session 1, these packets are guaranteed to travel a path diverse from packets with source and destination ports of x1 and y2, respectively.

The primary path/session 250 carries real/actual control plane messages, while the warm path/session 260 carries dummy control plane messages. Both sessions will carry iOAM data that indicates the performance related and other metrics of the path/session. The performance analysis server 240 uses the iOAM data to determine which path (primary or warm) has better performance, and sends a command/trigger to the vCP1 210(1) to toggle to the other path/session for use as the primary path.

FIG. 2. shows that, in one embodiment, the performance analysis server 240 may be a process running on a separate entity (server) that receives the per-path iOAM telemetry reports from the vCP1 210(1) and vUPF1 220(1). In another embodiment, there is a performance analysis process running on the user plane entities. For example, vUPF1 220(1) is configured to execute a performance analysis process 270. Instead of the vCP1 210(1) and vUPF1 220(1) sending the iOAM data to the performance analysis server 240, the performance analysis process 270 may obtain the iOAM data in packets it receives from the vCP1 210(1) and perhaps the iOAM data in packets the vCP1 210(1) receives from vUPF1 220(1), and the performance analysis process 270 computes the performance analytics on the primary path and warm path between the vCP1 210(1) and vUPF1 220(1).

Figure 3:
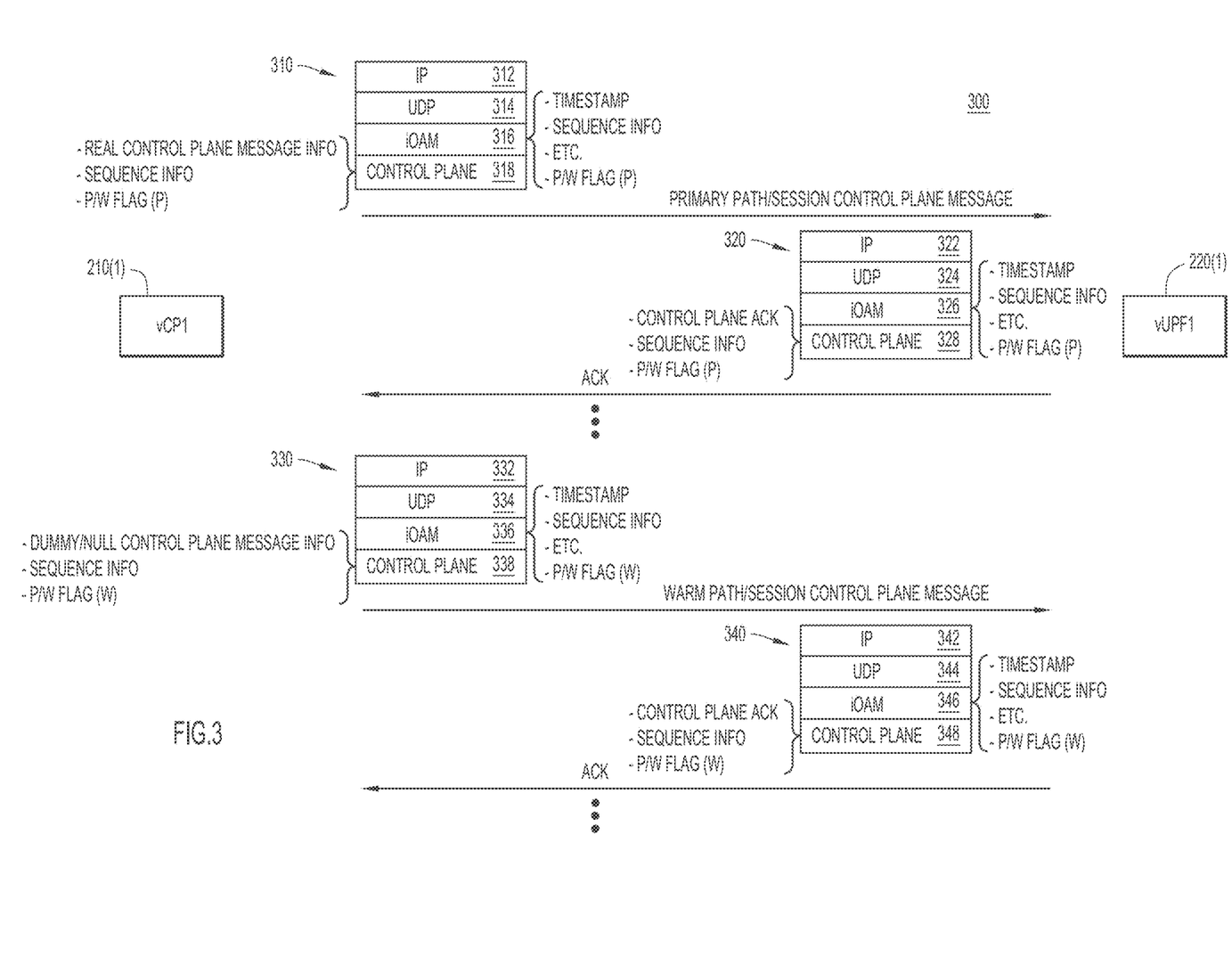
FIG. 3 is a diagram showing the messages exchanged as part of communications between the control plane entity and the user plane entity, according to an example embodiment.

Reference is now made to FIG. 3 for a further description of a process 300 for the exchange of messages between the vCP1 210(1) and the vUPF1 220(1), Reference is also made to FIG. 2 for purposes of the description of FIG. 3. In one form, vCP1 210(1) sends control plane messages over UDP to vUPF1 220(1). vUPF 220(1) creates a state entry for the UDP session. Since UDP is connectionless, it relies on acknowledgement (ACK) messages. For every message sent from vCP1 210(1), an ACK message is expected from the vUPF1 220(1). In the case in which the control plane messages are PFCP messages, the PFCP messages may include session establishment, session modification and session deletion messages.

As shown in FIG. 3, vCP1 210(1) sends a first message (primary path/session control plane message) 310 to the vUPF1 220(1), and the vUPF1 220(1) responds with ACK 320. The first message 310 includes an IP header 312, transport (e.g., UDP) header 314, an iOAM header 316 and a control plane message payload 318. The UDP header 314 includes source port and destination port information set to values associated with a first path through the network to the vUPF 220(1). The iOAM header 316 includes iOAM data such as timestamp information, sequence information, and perhaps other iOAM data. The control plane message payload 318 includes real control plane message information and sequence information. In one form, a primary/warm (P/W) flag is included to indicate whether the message is a message for primary path or a message for the warm path. In the case of message 310, the P/W flag is set to P. Moreover, the P/W flag can be included in the iOAM header 316 or in the control plane message payload 318.

The ACK 320 also includes an IP header 322, UDP header 324, iOAM header 326 and control plane message payload 328. The iOAM header 326 includes a timestamp, sequence information, and perhaps other iOAM data. The control plane message payload 328 includes a control plane ACK and sequence information. Like message 310, the ACK 320 includes a P/W flag (set to P) in either the iOAM header 326 or in the control plane message payload 328.

As indicated in FIG. 3, additional control plane message exchanges over the primary path occur in a similar manner.

vCP1 210(1) also sends a second message (warm path/session control plane message) 330 to the vUPF1 220(1), and the vUPF1 220(1) responds with ACK 340. The second message 330 includes an IP header 332, UDP header 334, an iOAM header 336 and a control plane message payload 338, The UDP header 334 includes source port and destination port information set to values associated with a second path (disjoint to the first path) through the network to the vUPF 220(1). The iOAM header 336 includes iOAM data such as timestamp information, sequence information, and perhaps other iOAM data. The control plane message payload 338 includes dummy/null control plane message information and sequence information. A primary/warm (P/W) flag is included to indicate whether the message is a message for primary path or a message for the warm path. In the case of message 330, the P/W flag is set to W. The P/W flag can be included in the iOAM header 336 or in the control plane message payload 338.

The ACK 340 also includes an IP header 342, UDP header 344, iOAM header 346 and control plane message payload 348. The iOAM header 346 includes a timestamp, sequence information, and perhaps other iOAM data. The control plane message payload 348 includes a control plane ACK and sequence information. Like message 330, the ACK 340 includes a P/W flag (set to W) in either the iOAM header 346 or in the control plane message payload 348.

As indicated in FIG. 3, additional control plane message exchanges over the warm path occur in a similar manner.

The vUPF1 220(1) reads the state of the P/W flag in the control plane messages it receives (messages 310 and 330) and knows when the P/W flag is set to P, then it should expect real or actual control plane message information and when the W is set, then it should expect dummy/null control plane message information.

As explained above, when creating the primary path/session and the warm path/session, different entropy in the packets will be used so that they take different paths through the network between the control plane entity and the user plane entity. Also, the user plane entity knows which session to consider primary and which to consider warm (based on the state of the P/W flag) so that it knows via which session to expect the dummy control plane message and the actual control plane message.

The dummy control plane message information included in message 330 fools other nodes in the network 130 (FIG. 2) to treat the message as an actual control plane message, but the vUPF1 220(1) knows it is a dummy message and will ignore it but send the iOAM data contained in the message to the performance analysis server. The dummy control plane message information may be a new message type (e.g., a new PFCP message type) to indicate that it is a "null" message. Both the control plane entities and user plane entities would be configured to know how to interpret that.

The iOAM data carried in messages shown in FIG. 3 may be in a new iOAM message type. Am iOAM trace type or flag field may be used, or a new flag with details in the trace option data to indicate the primary path/warm path flag.

Thus, as depicted in FIG. 1, the control plane entity generates first messages (messages 310) which include entropy that causes the first messages to traverse a first path in a network that is disjoint from a second path in the network. The first messages include first inband metadata that includes timestamp and sequence information, control plane message information, and a flag to indicate that the first messages are sent via the primary path and carry real control plane message information. The control plane entity also generates second messages (messages 330) which include entropy that causes the first messages to traverse the second path. The second messages include second inband metadata that includes timestamp and sequence information, dummy control plane message information, and a flag to indicate that the second messages are sent via the warm path and carry dummy control plane message information to be ignored by the user plane entity.

Entropy are key values derived from different features of a packet in a packet flow, and may include labels (e.g., MPLS labels), Layer 3 header (source IP address and destination IP address) information, transport (e.g., User Datagram Protocol) source port, transport destination port, etc.

Figure 4:
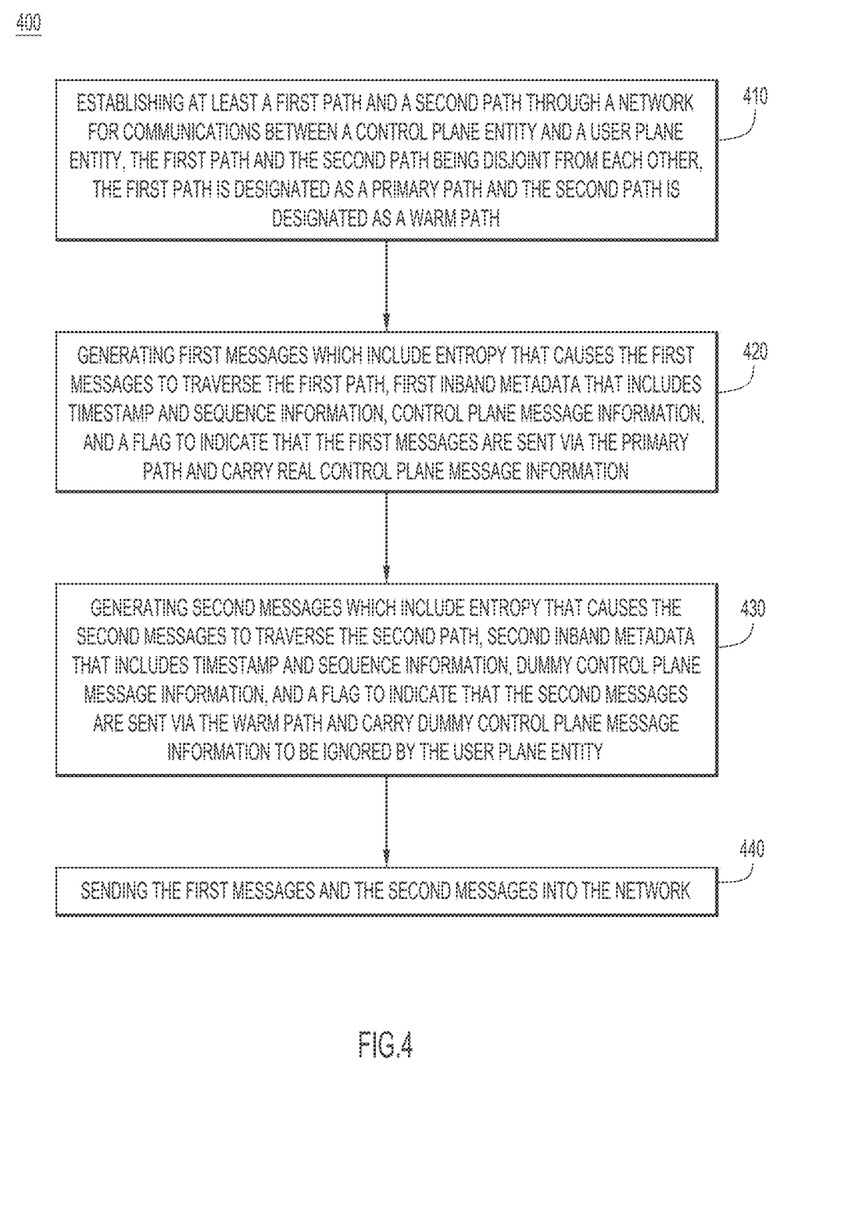
FIG. 4 is a flow chart depicting operations performed by the control plane entity, according to an example embodiment.

Reference is now made to FIG. 4. FIG. 4 illustrates a flow chart for a method 400 performed at a control plane entity, e.g., vCP 210(1) shown in FIG. 3, according to an example embodiment. At 410, the control plane entity establishes at least a first path and a second path through a network for communications between the control plane entity and a user plane entity. The first path and the second path are disjoint from each other. In one example, the first path is designated as a primary path and the second path is designated as a warm path, though this is arbitrary. Further, in one example, the first path and the second path are established based on commands obtained from a path computation entity or a network controller entity.

At 420, the control plane entity generates first messages which include entropy that causes the first messages to traverse the first path, first inband metadata that includes timestamp and sequence information, control plane message information, and a flag to indicate that the first messages are sent via the primary path and carry real control plane message information. Similarly, at 430, the control plane entity generates second messages which include entropy that causes the second messages to traverse the second path, second inband metadata that includes timestamp and sequence information, dummy control plane message information, and a flag to indicate that the second messages are sent via the warm path and carry dummy control plane message information to be ignored by the user plane entity.

At 440, the control plane entity provides/sends the first messages and the second messages into the network.

As described above, in one form, the control plane message information in the first messages and second messages is in accordance with a Packet Forwarding Control Protocol (PFCP) of the 3$^{rd}$ Generation Partnership Project. The first inband metadata and the second inband metadata is formatted in accordance with one of: the in-situ Operations, Administration and Management (iOAM) standard, Inband Flow Analytics (IFA) standard and Inband Network Telemetry (INT) standard. In addition, the flag of the first messages is included either as part of the first inband metadata or as part of the control plane message information, and the flag of the second messages is included either as part of the second inband metadata or as part of the dummy control plane message information. Further still, the entropy in the first messages may comprise transport (e.g., UDP) source port and transport (e.g., UDP) destination port information.

As explained above in connection with FIG. 3, the user plane entity obtains the first inband metadata from the first messages (sent over the first path) and the second inband metadata from the second messages (sent over the second path). The user plane entity provides the first inband metadata and the second inband metadata to a performance analysis process, e.g. a process running on the performance analysis server 240 or the performance analysis process 270 running on the vUPF1 220(1), as shown in FIG. 2.

The control plane entity 210(1) will also send to the performance analysis process the inband metadata. in ACK messages received from the vUPF1 220(1) for both the primary path and the warm path. Thus, the performance analysis process can also use the inband metadata contained in the messages sent from the user plane entity to the control plane entity for purposes of analyzing the performance of the first path and the second path.

Turning now to FIG. 5, a flow chart is shown for a method 500 by which iOAM data is analyzed for best path selection. The method 500 may be performed by a process that may run on the performance analysis server 240 or executed by the performance analysis process 270, both shown in FIG. 2. At 510, the performance analysis process obtains first inband metadata included in first messages sent between a control plane entity and a user plane entity through a first path in a network. The first metadata includes timestamp and sequence information for the first messages sent through the first path. The first messages further include a flag to indicate that the first messages are sent via a primary path and carry real control plane message information. At 520, the performance analysis process obtains second inband metadata included in second messages sent between a control plane entity and a user plane entity through a second path in the network. The first path and the second path are disjoint from each other. The second metadata includes timestamp and sequence information for the second messages sent through the second path. The second messages further include a flag to indicate that the second messages are sent via a warm path and carry dummy control plane message information.

At 530, the performance analysis process analyzes performance of the first path and of the second path based on the first inband metadata and the second inband metadata. For example, the performance analysis process analyzes performance of the first path and the second path by computing one or more of latency, jitter and packet loss for the first path based on the first inband metadata and computing one or more of latency, jitter and packet loss for the second path based. on the second inband metadata. The performance analysis process compares one or more of latency, jitter and packet loss for the first path with corresponding one or more of latency, jitter and packet loss for the second path. The latency, jitter or packet loss on the second path may, at some point in time, become better than the latency, jitter or packet loss on the first path. When that happens, the performance analysis process may determine to toggle a state of the first path and of the second path such the first path is/becomes the warm path and the second path is/becomes the primary path. In other words, at 540, based on the analyzing step 530, the performance analysis process determines whether (or not) to toggle a state of the first path and of the second path such that the first path is the warm path and the second path is the primary path.

At 550, when it is determined that performance of the second path is better than performance of the first path, the performance analysis process provides a command/trigger at least to the control plane entity to cause the control plane entity to generate the first messages to include the dummy control plane message information and to set the flag of the first messages to indicate that the first messages are sent via the warm path, and to cause the control plane entity to generate the second messages to include the real control plane message information and to set the flag of the second messages to indicate that the second messages are sent via the primary path.

Thus, the performance analysis process (running on the performance analysis server or in an performance analysis process running on the user plane entity) can control the control plane entity to toggle to the other path and make what had been previously the warm path (the second path), now the primary path, and what had been previously the primary path (the first path), now the warm path. It is to be understood that at some time later, it is possible that the inband metadata may reveal that the paths should be toggled back, such that the first path becomes the primary path and the second path becomes the warm path. The session/path that has better performance (e.g., least delay, least jitter and/or least number of packet drops) will be marked as the primary/active session and will be actively used for control plane communication, whereas the other session/path is marked as the warm path/session.

Figure 6:
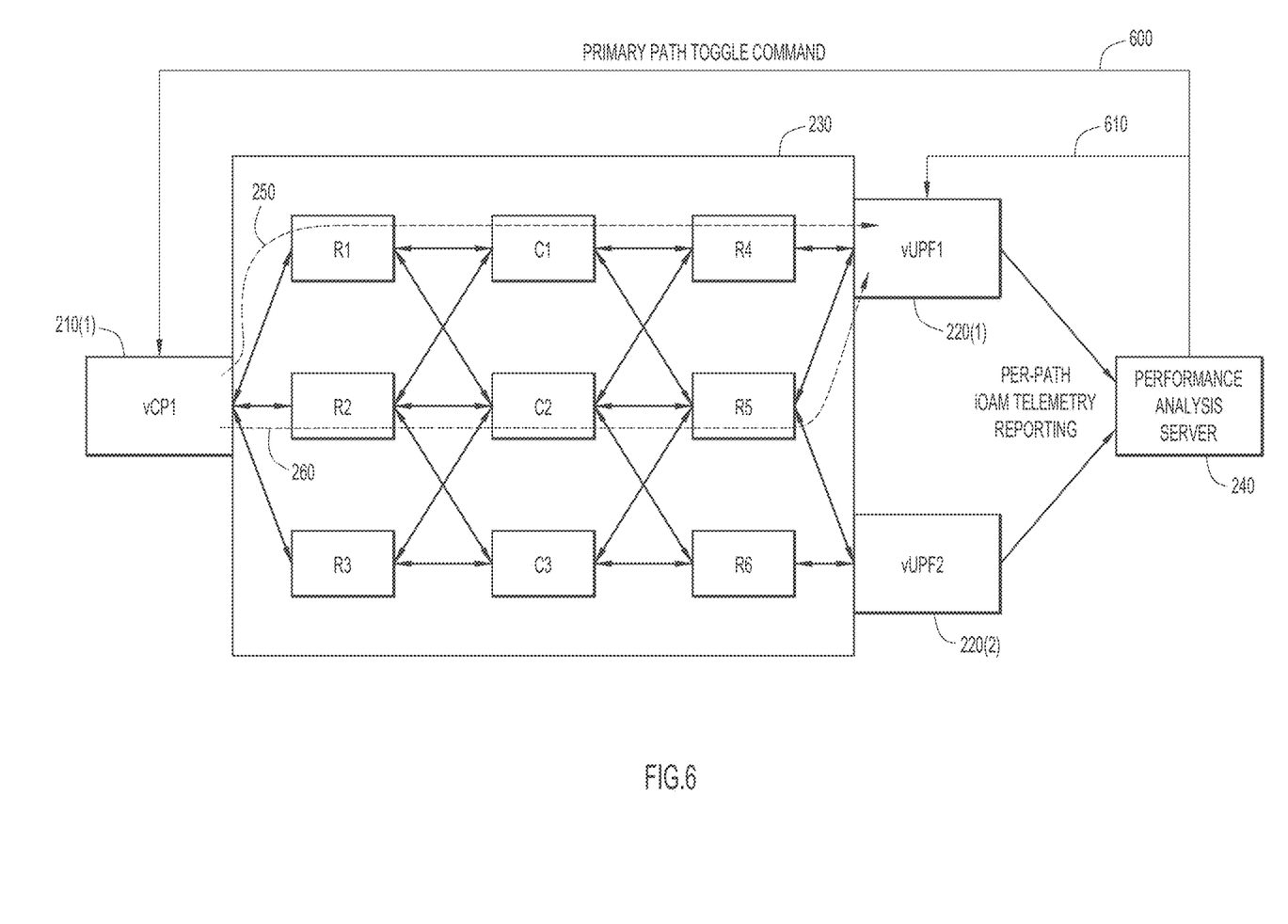
FIG. 6 is a block diagram depicting best path selection between the control plane entity and the user plane entity, according to an example embodiment.

FIG. 6 illustrates this in a graphical manner where the performance analysis server 240, for example, obtains the per-path iOAM telemetry reporting data from the vUPF1 220(1) (and from the vCP1 210(1)). The performance analysis server 240 will issue a command/trigger to the vCP1 210(1), as shown at 600, and optionally to the vUPF1 220(1) as shown at 610, to cause the vCP1 210(1) to toggle the content of the messages sent through the network on the respective first and second paths 250 and 260.

In the case in which the vUPF1 220(1) runs the performance analysis process 270 (as shown in FIG. 2), the control plane messages or iOAM may be used to signal back to the vCP1 210(1) about degradation of performance of the primary path/session and thus the need to toggle such that what had been the warm path/session now becomes the primary path/session.

For example, the first path/session 250 over path R1-C1-R4 may better performing and accordingly will be marked as the primary/active session while the second path/session 260 over path R2-C2-R5 will be marked as the warm session. The active session will be actively used for control plane communication while the warm session will still continue to use simple/dummy control plane message information with iOAM header inserted for analytics.

Performance of any path may change based on various factors. Thus, at some point in time, the second path/session 260 may be determined to perform better than the first path/session 250, and as such, the second path/session 260 will be marked as the primary/active session while the first path/session 250 one will be marked as the warm path/session.

When switching the warm path to the primary path (and vice versa), changes are made to the payload content of the messages to make this indication (using the aforementioned primary/warm path flag) and the control plane message (e.g., PFCP message) is changed to carry actual PFCP message information (for the primary path), not the dummy message which had been sent when the path was used as the warm path. No changes are made to the entropy/header so that messages/packets always take the same path through the network 230 they had been taking.

Sequencing at the control plane (PFCP) layer. When a path/session is upgraded from warm path to primary/active path, it may be useful to keep track of the sequencing so that the control plane messages in the warm path can pick up where the control plane messages left off in the primary path right before the switch to be sure control plane message information is not missed. For example, the user plane entity could receive control plane dummy message sequence numbers 100, 101 and then real control plane message number 103 on the primary path after the switch. The user plane entity would then know that it missed the real control plane message 102, and would need to request it again from the control plane entity.

Sequencing at the iOAM layer. The iOAM metadata will have all the details about the sequencing, timestamp, etc., which is used for measuring packet loss, delay and jitter. Thus, sequencing analysis at the iOAM layer is more relevant for packet loss, delay and jitter computation.

Figure 7:
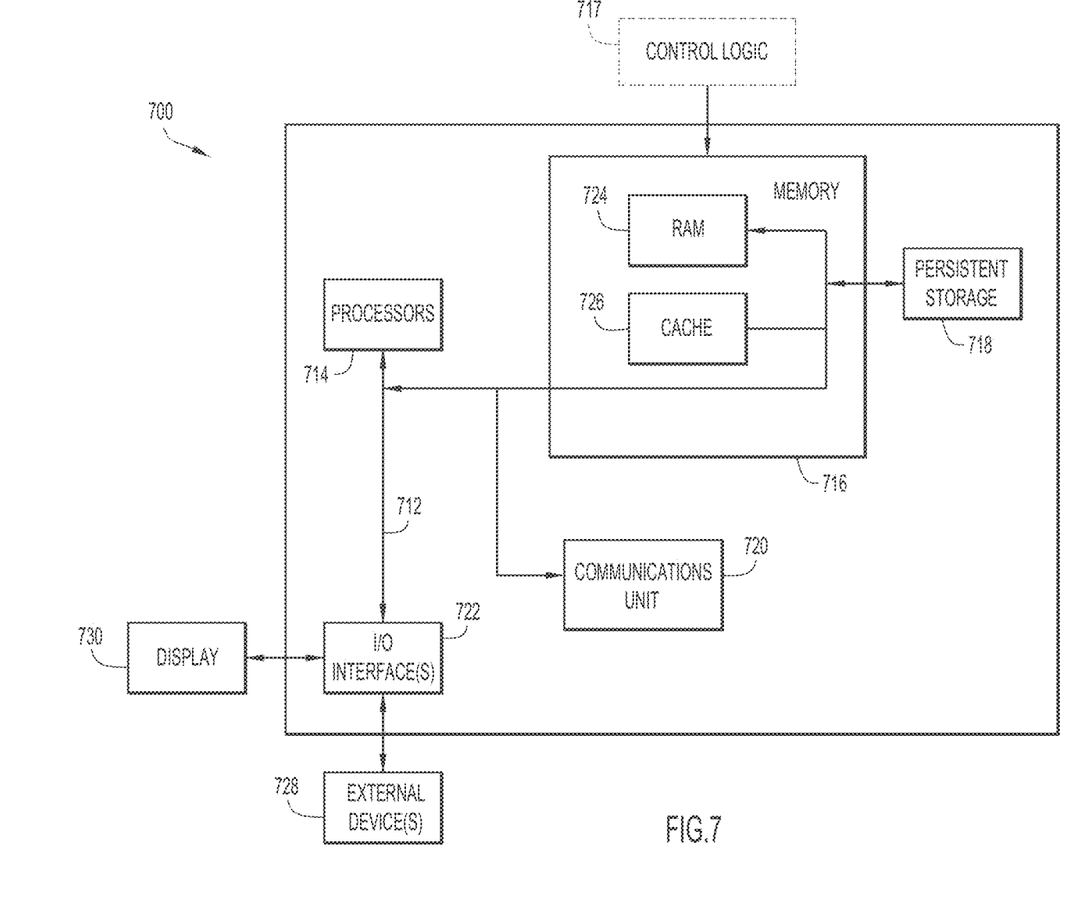
FIG. 7 is a block diagram of a computing device configured to perform the operations presented herein on behalf of a control plane entity, user plane entity and performance analysis server, according to an example embodiment.

FIG. 7 illustrates a hardware block diagram of a computing device 700 that may perform functions of the control plane entity, user plane entity and performance analysis server described above in connection with FIGS. 1-6. It should be appreciated that FIG. 7 provides only an illustration of one embodiment and does not imply any limitations with regard to the environments in which different embodiments may be implemented. Many modifications to the depicted environment may be made.

As depicted, the device 700 includes a bus 712, which provides communications between computer processor(s) 714, memory 716, persistent storage 718, communications unit 720, and input/output (I/O) interface(s) 722. Bus 712 can be implemented with any architecture designed for passing data and/or control information between processors (such as microprocessors, communications and network processors, etc.), system memory, peripheral devices, and any other hardware components within a system. For example, bus 712 can be implemented with one or more buses.

Memory 716 and persistent storage 718 are computer readable storage media. In the depicted embodiment, memory 716 includes random access memory (RAM) 724 and cache memory 726. In general, memory 716 can include any suitable volatile or non-volatile computer readable storage media. Instructions for the control logic 717 that controls and performs operations of the control plane entity, user plane entity and performance analysis process, may be stored in memory 716 or persistent storage 718 for execution by processor(s) 714. When the processor(s) 714 execute the control logic for the control plane entity, the processor(s) 714 are caused to perform the control plane entity described above in connection with FIGS. 1-6. When the processor(s) 714 execute the control logic for the user plane entity, the processor(s) 714 are caused to perform the user plane entity described above in connection with FIGS. 1-6. When the processor(s) 714 execute the control logic for performance analysis server 240 or performance analysis process 270 shown in FIG. 2), the processor(s) 714 are caused to perform the performance analysis process described above in connection with FIGS. 1-6.

One or more programs may be stored in persistent storage 718 for execution by one or more of the respective computer processors 714 via one or more memories of memory 716. The persistent storage 718 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 718 may also be removable. For example, a removable hard drive may be used for persistent storage 718. Other examples include optical and magnetic disks, thumb drives, and smart cards that are inserted into a drive for transfer onto another computer readable storage medium that is also part of persistent storage 718.

Communications unit 720, in these examples, provides for communications with other data processing systems or devices. In these examples, communications unit 720 includes one or more network interface cards. Communications unit 720 may provide communications through the use of either or both physical and wireless communications links.

I/O interface(s) 722 allows for input and output of data with other devices that may be connected to computer device 700. For example, I/O interface 722 may provide a connection to external devices 728 such as a keyboard, keypad, a touch screen, and/or some other suitable input device. External devices 728 can also include portable computer readable storage media such as database systems, thumb drives, portable optical or magnetic disks, and memory cards.

Software and data used to practice embodiments can be stored on such portable computer readable storage media and can be loaded onto persistent storage 718 via I/O interface(s) 722. I/O interface(s) 722 may also connect to a display 730. Display 730 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, a method is provided comprising: at a control plane entity, establishing at least a first path and a second path through a network for communications between the control plane entity and a user plane entity, the first path and the second path being disjoint from each other, wherein the first path is designated as a primary path and the second path is designated as a warm path; generating first messages which include entropy that causes the first messages to traverse the first path, first inband metadata that includes timestamp and sequence information, control plane message information, and a flag to indicate that the first messages are sent via the primary path and carry real control plane message information; generating second messages which include entropy that causes the second messages to traverse the second path, second inband metadata that includes timestamp and sequence information, dummy control plane message information, and a flag to indicate that the second messages are sent via the warm path and carry dummy control plane message information to be ignored by the user plane entity; and sending the first messages and the second messages into the network.

Similarly, an apparatus is provided comprising a communication interface, and a processor coupled to the communication interface, wherein the processor is configured to perform operations including: at a control plane entity, establishing at least a first path and a second path through a network for communications between the control plane entity and a user plane entity, the first path and the second path being disjoint from each other, wherein the first path is designated as a primary path and the second path is designated as a warm path; generating first messages which include entropy that causes the first messages to traverse the first path, first inband metadata that includes timestamp and sequence information, control plane message information, and a flag to indicate that the first messages are sent via the primary path and carry real control plane message information; generating second messages which include entropy that causes the second messages to traverse the second path, second inband metadata that includes timestamp and sequence information, dummy control plane message information, and a flag to indicate that the second messages are sent via the warm path and carry dummy control plane message information to be ignored by the user plane entity; and sending the first messages and the second messages into the network.

Further, one or more non-transitory computer readable media are provided, encoded with instructions that, when executed by a processor, cause the processor to perform operations including: at a control plane entity, establishing at least a first path and a second path through a network for communications between the control plane entity and a user plane entity, the first path and the second path being disjoint from each other, wherein the first path is designated as a primary path and the second path is designated as a warm path; generating first messages which include entropy that causes the first messages to traverse the first path, first inband metadata that includes timestamp and sequence information, control plane message information, and a flag to indicate that the first messages are sent via the primary path and carry real control plane message information; generating second messages which include entropy that causes the second messages to traverse the second path, second inband metadata that includes timestamp and sequence information, dummy control plane message information, and a flag to indicate that the second messages are sent via the warm path and carry dummy control plane message information to be ignored by the user plane entity; and sending the first messages and the second messages into the network.

In addition, a method is provided comprising: obtaining first inband metadata included in first messages sent between a control plane entity and a user plane entity through a first path in a network, the first inband metadata including timestamp and sequence information for the first messages sent through the first path, the first messages further including a flag to indicate that the first messages are sent via a primary path and carry real control plane message information; obtaining second inband metadata included in second messages sent between a control plane entity and a user plane entity through a second path in the network, wherein the first path and the second path are disjoint from each other, and wherein the second inband metadata including timestamp and sequence information for the second messages sent through the second path, the second messages further including a flag to indicate that the second messages are sent via a warm path and carry dummy control plane message information; analyzing performance of the first path and of the second path based on the first inband metadata on and the second inband metadata; based on the analyzing, determining whether to toggle a state of the first path and of the second path such that the first path is the warm path and the second path is the primary path; and when it is determined that performance of the second path is better than performance of the first path, providing a command at least to the control plane entity to cause the control plane entity to generate the first messages to include the dummy control plane message information and to set the flag of the first messages to indicate that the first messages are sent via the warm path, and to cause the control plane entity to generate the second messages to include the real control plane message information and to set the flag of the second messages to indicate that the second messages are sent via the primary path.

Further, an apparatus is provided comprising a communication interface, and a processor coupled to the communication interface, wherein the processor is configured to perform operations including: obtaining first inband metadata included in first messages sent between a control plane entity and a user plane entity through a first path in a network, the first inband metadata including timestamp and sequence information for the first messages sent through the first path, the first messages further including a flag to indicate that the first messages are sent via a primary path and carry real control plane message information; obtaining second inband metadata included in second messages sent between a control plane entity and a user plane entity through a second path in the network, wherein the first path and the second path are disjoint from each other, and wherein the second inband metadata including timestamp and sequence information for the second messages sent through the second path, the second messages further including a flag to indicate that the second messages are sent via a warm path and carry dummy control plane message information; analyzing performance of the first path and of the second path based on the first inband metadata on and the second inband metadata; based on the analyzing, determining whether to toggle a state of the first path and of the second path such that the first path is the warm path and the second path is the primary path; and when it is determined that performance of the second path is better than performance of the first path, providing a command at least to the control plane entity to cause the control plane entity to generate the first messages to include the dummy control plane message information and to set the flag of the first messages to indicate that the first messages are sent via the warm path, and to cause the control plane entity to generate the second messages to include the real control plane message information and to set the flag of the second messages to indicate that the second messages are sent via the primary path.

Still further, one or more non-transitory computer readable media are provided, encoded with instructions that, when executed by a processor, cause the processor to perform operations including: obtaining first inband metadata included in first messages sent between a control plane entity and a user plane entity through a first path in a network, the first inband metadata including timestamp and sequence information for the first messages sent through the first path, the first messages further including a flag to indicate that the first messages are sent via a primary path and carry real control plane message information; obtaining second inband metadata included in second messages sent between a control plane entity and a user plane entity through a second path in the network, wherein the first path and the second path are disjoint from each other, and wherein the second inband metadata including timestamp and sequence information for the second messages sent through the second path, the second messages further including a flag to indicate that the second messages are sent via a warm path and carry dummy control plane message information; analyzing performance of the first path and of the second path based on the first inband metadata on and the second inband metadata; based on the analyzing, determining whether to toggle a state of the first path and of the second path such that the first path is the warm path and the second path is the primary path; and when it is determined that performance of the second path is better than performance of the first path, providing a command at least to the control plane entity to cause the control plane entity to generate the first messages to include the dummy control plane message information and to set the flag of the first messages to indicate that the first messages are sent via the warm path, and to cause the control plane entity to generate the second messages to include the real control plane message information and to set the flag of the second messages to indicate that the second messages are sent via the primary path.

In still another form, a system is provided comprising: a control plane entity configured to: establish at least a first path and a second path through a network for communications between the control plane entity and a user plane entity, the first path and the second path being disjoint from each other, wherein the first path is designated as a primary path and the second path is designated as a warm path; generate first messages which include entropy that causes the first messages to traverse the first path, first inband metadata that includes timestamp and sequence information, control plane message information, and a flag to indicate that the first messages are sent via the primary path and carry real control plane message information; generate second messages which include entropy that causes the first messages to traverse the second path, second inband metadata that includes timestamp and sequence information, dummy control plane message information, and a flag to indicate that the second messages are sent via the warm path and carry dummy control plane message information to be ignored by the user plane entity; send the first messages and the second messages into the network; a user plane entity configured to: obtain the first inband metadata from the first messages and second the inband metadata from the second messages; and send the first inband metadata and the second inband metadata to a performance analysis server; the performance analysis server configured to: analyze performance of the first path and of the second path based on the first inband metadata and the second inband metadata; and determine whether to toggle a state of the first path and of the second path such that the first path is the warm path and the second path is the primary path.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a control plane node, establishing at least a first path and a second path through a network for communications between the control plane node and a user plane node, the first path and the second path being disjoint from each other, wherein the first path is designated as a primary path and the second path is designated as a warm path;
   generating first messages which include entropy that causes the first messages to traverse the first path, wherein the first messages include first inband metadata, that includes timestamp and sequence information, control plane message information, and a flag to indicate that the first messages are sent via the primary path and carry real control plane message information;
   generating second messages which include entropy that causes the second messages to traverse the second path, wherein the second messages include second inband metadata, that includes timestamp and sequence information, dummy control plane message information, and a flag to indicate that the second messages are sent via the warm path and carry dummy control plane message information to be ignored by the user plane node; and
   sending the first messages and the second messages as data packets into the network.

2. The method of claim 1, further comprising:
   at the user plane node, obtaining the first inband metadata from the first messages and the second inband metadata from the second messages; and at the user plane node, providing the first inband metadata and the second inband metadata to a performance analysis process.

3. The method of claim 2, further comprising:
analyzing performance of the first path and of the second path based on the first inband metadata and the second inband metadata;
based on the analyzing, determining whether to toggle a state of the first path and of the second path such that the first path is the warm path and the second path is the primary path; and
when it is determined that performance of the second path is better than performance of the first path, providing a trigger at least to the control plane node to cause the control plane node to generate the first messages to include the dummy control plane message information and to set the flag of the first messages to indicate that the first messages are sent via the warm path, and to cause the control plane node to generate the second messages to include the real control plane message information and to set the flag of the second messages to indicate that the second messages are sent via the primary path.

4. The method of claim 3, wherein analyzing performance comprises:
computing one or more of latency, jitter and packet loss for the first path based on the first inband metadata and computing one or more of latency, jitter and packet loss for the second path based on the second inband metadata; and
comparing one or more of latency, jitter and packet loss for the first path with corresponding one or more of latency, jitter and packet loss for the second path.

5. The method of claim 3, wherein the performance analysis process is executed on an node that is separate from, but in communication with, the control plane node and the user plane node.

6. The method of claim 3, wherein the performance analysis process is executed on the user plane node.

7. The method of claim 1, wherein establishing the first path and the second path is based on commands obtained from a path computation node or a network controller node.

8. The method of claim 1, wherein the control plane message information is in accordance with a Packet Forwarding Control Protocol (PFCP) of a $3^{rd}$ Generation Partnership Project.

9. The method of claim 1, wherein the first inband metadata and the second inband metadata is formatted in accordance with one of: in-situ Operations, Administration and Management (iOAM) standard, Inband Flow Analytics (IFA) standard and Inband Network Telemetry (INT) standard.

10. The method of claim 1, wherein the flag of the first messages is included either as part of the first inband metadata or as part of the control plane message information, and the flag of the second messages is included either as part of the second inband metadata or as part of the dummy control plane message information.

11. The method of claim 1, wherein the entropy in the first messages comprises transport source port and transport destination port information.

12. The method of claim 1, wherein the user plane node obtains the first inband metadata and the second inband metadata using a virtual network function that runs proximate to the user plane node, and the method further comprising:

based on determining that performance of the second path is better than performance of the first path, providing a trigger at least to the control plane node to cause the control plane node to generate the first messages to include the dummy control plane message information and to set the flag of the first messages to indicate that the first messages are sent via the warm path, and to cause the control plane node to generate the second messages to include the real control plane message information and to set the flag of the second messages to indicate that the second messages are sent via the primary path, wherein the first messages and the second messages further include telemetry metrics.

13. A method comprising:
obtaining first inband metadata included in first messages sent, as first data packets, between a control plane node and a user plane node through a first path in a network, the first inband metadata including timestamp and sequence information for the first messages sent through the first path, the first messages further including a flag to indicate that the first messages are sent via a primary path and carry real control plane message information;
obtaining second inband metadata included in second messages sent, as second data packets, between the control plane node and the user plane node through a second path in the network, wherein the first path and the second path are disjoint from each other, and wherein the second inband metadata including timestamp and sequence information for the second messages sent through the second path, the second messages further including a flag to indicate that the second messages are sent via a warm path and carry dummy control plane message information;
analyzing performance of the first path and of the second path based on the first inband metadata on and the second inband metadata;
based on the analyzing, determining whether to toggle a state of the first path and of the second path such that the first path is the warm path and the second path is the primary path; and
when it is determined that performance of the second path is better than performance of the first path, providing a command at least to the control plane node to cause the control plane node to generate the first messages to include the dummy control plane message information and to set the flag of the first messages to indicate that the first messages are sent via the warm path, and to cause the control plane node to generate the second messages to include the real control plane message information and to set the flag of the second messages to indicate that the second messages are sent via the primary path.

14. The method of claim 13, wherein analyzing comprises:
computing one or more of latency, jitter and packet loss for the first path based on the first inband metadata and computing one or more of latency, jitter and packet loss for the second path based on the second inband metadata; and
comparing one or more of latency, jitter and packet loss for the first path with corresponding one or more of latency, jitter and packet loss for the second path.

15. The method of claim 13, wherein obtaining the first inband metadata, obtaining the second inband metadata, analyzing, determining and providing are performed on a node that is separate from, but in communication with, the control plane node and the user plane node.

16. The method of claim 13, wherein obtaining the first inband metadata, obtaining the second inband metadata, analyzing, determining and providing are performed on the user plane node.

17. The method of claim 13, wherein the first inband metadata and the second inband metadata is formatted in accordance with one of: in-situ Operations, Administration and Management (iOAM) standard, Inband Flow Analytics (IFA) standard and Inband Network Telemetry (INT) standard.

18. A system comprising:
a control plane node configured to:
establish at least a first path and a second path through a network for communications between the control plane node and a user plane node, the first path and the second path being disjoint from each other, wherein the first path is designated as a primary path and the second path is designated as a warm path;
generate first messages which include entropy that causes the first messages to traverse the first path, wherein the first messages include first inband metadata that includes timestamp and sequence information, control plane message information, and a flag to indicate that the first messages are sent via the primary path and carry real control plane message information;
generate second messages which include entropy that causes the first messages to traverse the second path, wherein the second messages include second inband metadata, that includes timestamp and sequence information, dummy control plane message information, and a flag to indicate that the second messages are sent via the warm path and carry dummy control plane message information to be ignored by the user plane node;
send the first messages and the second messages as data packets into the network; the user plane node configured to:
obtain the first inband metadata from the first messages and second the inband metadata from the second messages; and
send the first inband metadata and the second inband metadata to a performance analysis server;
the performance analysis server configured to:
analyze performance of the first path and of the second path based on the first inband metadata and the second inband metadata; and
determine whether to toggle a state of the first path and of the second path such that the first path is the warm path and the second path is the primary path.

19. The system of claim 18, wherein the performance analysis server is configured to:
when a determination is made that performance of the second path is better than performance of the first path, provide a command at least to the control plane node to cause the control plane node to generate the first messages to include the dummy control plane message information and to set the flag of the first messages to indicate that the first messages are sent via the warm path, and to cause the control plane node to generate the second messages to include the real control plane message information and to set the flag of the second messages to indicate that the second messages are sent via the primary path.

20. The system of claim 19, wherein the performance analysis server is configured to analyze by:
computing one or more of latency, jitter and packet loss for the first path based on the first inband metadata and computing one or more of latency, jitter and packet loss for the second path based on the second inband metadata; and
comparing one or more of latency, jitter and packet loss for the first path with corresponding one or more of latency, jitter and packet loss for the second path.

* * * * *